United States Patent
Matthews et al.

(10) Patent No.: US 11,433,955 B2
(45) Date of Patent: Sep. 6, 2022

(54) VIRTUAL AIR DAM

(71) Applicant: Magna Exteriors Inc., Concord (CA)

(72) Inventors: Martin R. Matthews, Troy, MI (US); Anthony J. Povinelli, Romeo, MI (US); Yao Wang, Troy, MI (US)

(73) Assignee: Magna Exteriors Inc., Concord (CA)

( * ) Notice: Subject to any disclaimer, the term of this patent is extended or adjusted under 35 U.S.C. 154(b) by 6 days.

(21) Appl. No.: 16/955,243

(22) PCT Filed: Dec. 18, 2018

(86) PCT No.: PCT/IB2018/060290
§ 371 (c)(1),
(2) Date: Jun. 18, 2020

(87) PCT Pub. No.: WO2019/123280
PCT Pub. Date: Jun. 27, 2019

(65) Prior Publication Data
US 2020/0324835 A1 Oct. 15, 2020

Related U.S. Application Data

(60) Provisional application No. 62/607,106, filed on Dec. 18, 2017.

(51) Int. Cl.
*B62D 35/00* (2006.01)
*B62D 35/02* (2006.01)
(Continued)

(52) U.S. Cl.
CPC .............. *B62D 35/02* (2013.01); *B60R 19/48* (2013.01); *B62D 35/005* (2013.01); *B62D 37/02* (2013.01);
(Continued)

(58) Field of Classification Search
CPC ...... B62D 35/005; B62D 35/02; B62D 37/02; B60R 19/48; B60R 2019/48; B60R 2019/486; F15D 1/0095
See application file for complete search history.

(56) References Cited

U.S. PATENT DOCUMENTS 4,585,262 A * 4/1986 Parks ................... B62D 35/005
296/180.1
5,074,592 A * 12/1991 White .................. B62D 25/168
280/851
(Continued)

FOREIGN PATENT DOCUMENTS

EP      2671784 A1      11/2013
JP      2009248963 A    10/2009
(Continued)

OTHER PUBLICATIONS

International Search Report for PCT/IB20180/60290 dated Apr. 12, 2019.

*Primary Examiner* — Gregory A Blankenship
(74) *Attorney, Agent, or Firm* — Warn Partners, P.C.

(57) ABSTRACT

An air dam for a vehicle having a front panel with a downward facing surface at a lateral front edge. At least one air curtain such as an air jet forces air downward toward the ground for creating an aerodynamic barrier of air which reduces turbulence caused by the underbody of a vehicle while the vehicle is underway.

15 Claims, 10 Drawing Sheets

(51) Int. Cl.
  *B60R 19/48*  (2006.01)
  *B62D 37/02*  (2006.01)
  *F15D 1/00*  (2006.01)

(52) U.S. Cl.
  CPC ...... *F15D 1/0095* (2013.01); *B60R 2019/486* (2013.01)

(56) References Cited

U.S. PATENT DOCUMENTS

| | | | | |
|---|---|---|---|---|
| 5,301,996 | A | * | 4/1994 | Theis .................... B60B 39/026 180/903 |
| 5,555,594 | A | * | 9/1996 | Maddalena ........... B60B 39/026 15/313 |
| 7,055,638 | B2 | | 6/2006 | Kalighi et al. |
| 9,254,876 | B2 | | 2/2016 | Yamaguchi et al. |
| 2005/0029027 | A1 | * | 2/2005 | Kunikata ................ B60K 11/04 180/68.1 |
| 2006/0196638 | A1 | | 9/2006 | Glezer et al. |
| 2015/0321707 | A1 | * | 11/2015 | Menicovich ........... B62D 37/02 296/180.1 |
| 2016/0061194 | A1 | | 3/2016 | Refai-Ahmed et al. |
| 2017/0355333 | A1 | * | 12/2017 | Kishima .............. B62D 35/005 |
| 2019/0342985 | A1 | * | 11/2019 | Dadheech ........... H05H 1/2481 |
| 2020/0180708 | A1 | * | 6/2020 | Khalighi ............. H05H 1/2406 |
| 2020/0324835 | A1 | * | 10/2020 | Matthews ............. B62D 37/02 |

FOREIGN PATENT DOCUMENTS

| | | | |
|---|---|---|---|
| KR | 20090058858 | A | 6/2009 |
| WO | 2014130425 | A1 | 8/2014 |

\* cited by examiner

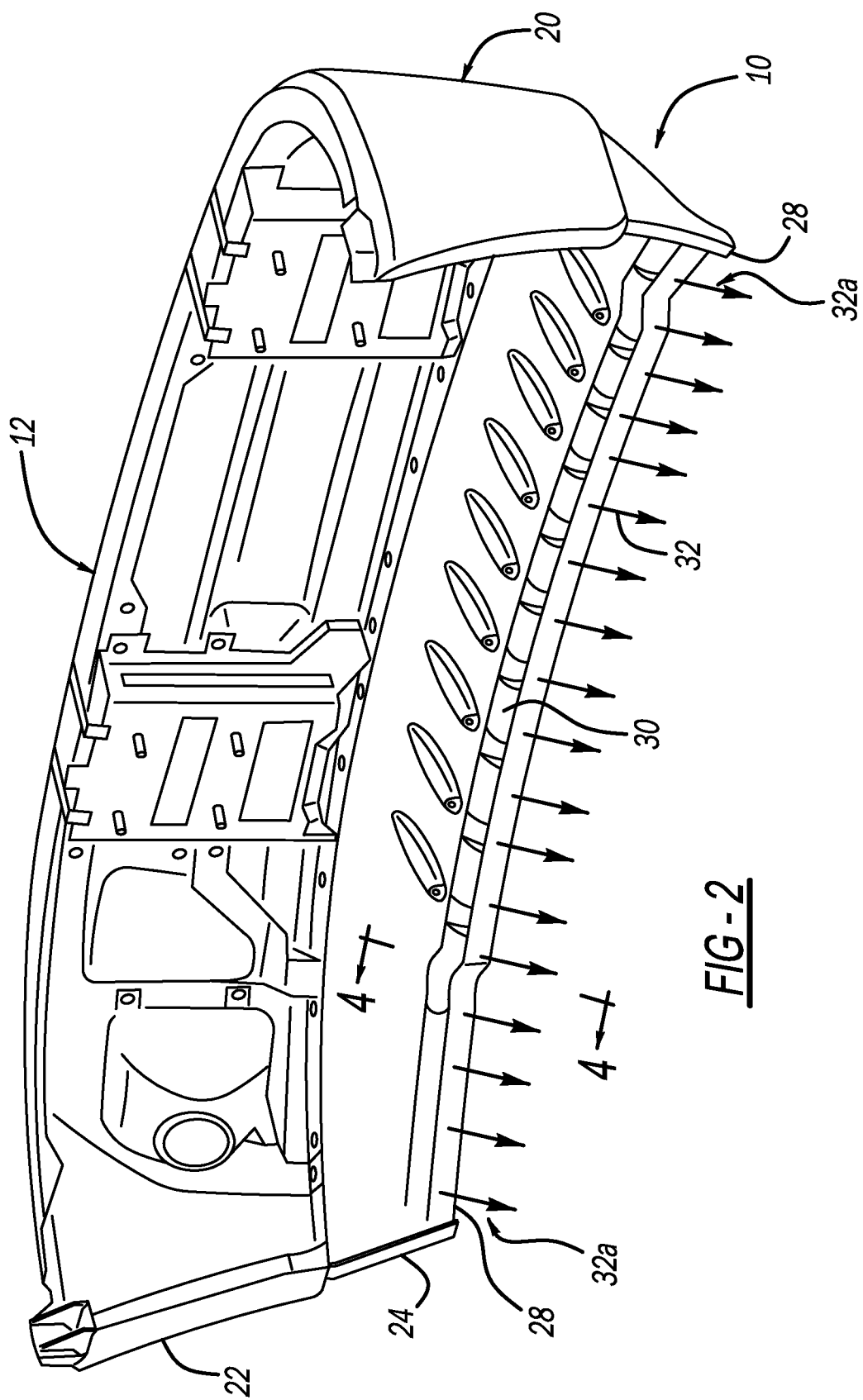

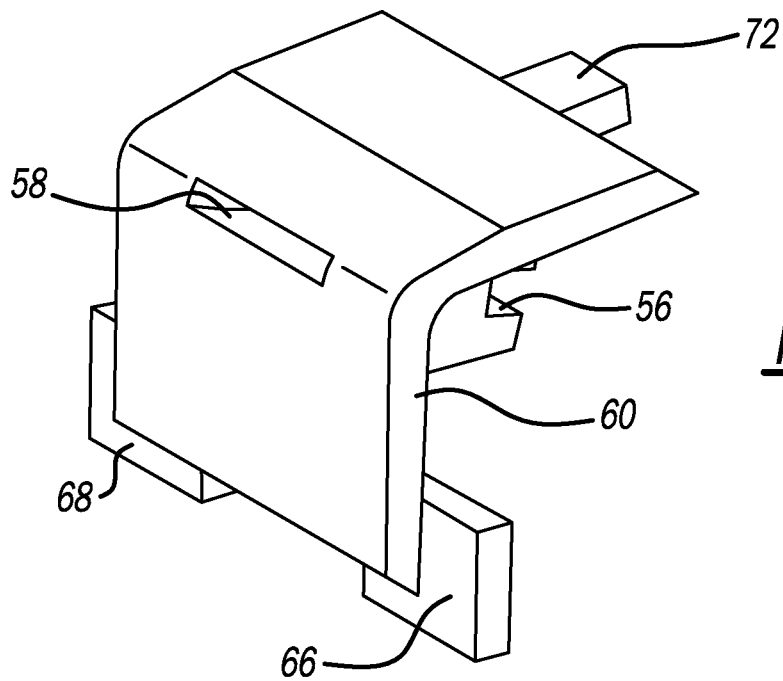
*FIG - 12*
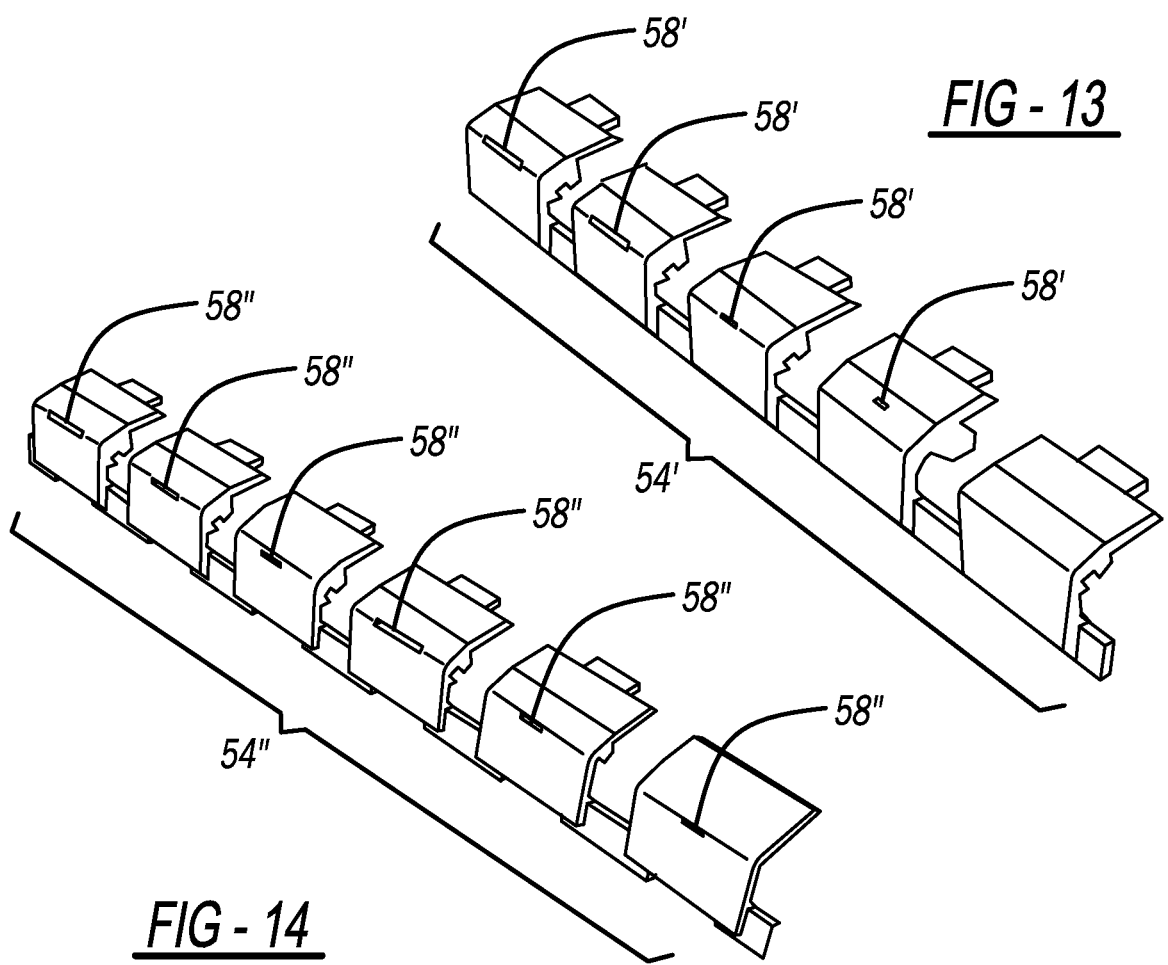
*FIG - 13*
*FIG - 14*

VIRTUAL AIR DAM

CROSS-REFERENCE TO RELATED APPLICATIONS

This application is a National Stage of PCT International Application No. PCT/IB2018/060290, filed Dec. 18, 2018, which claims the benefit of U.S. Provisional Patent Application No. 62/607,106, filed Dec. 18, 2017. The disclosures of the above applications are incorporated herein by reference.

FIELD OF THE INVENTION

The present invention relates to an air dam for removing turbulence associated with the underbody of a vehicle.

BACKGROUND OF THE INVENTION

A high percentage of gas consumed by an SUV or pickup truck at highway speeds is due to aerodynamic drag of the underbody. Fixed air dams have been used to improve aerodynamics. But such systems are of limited ineffectiveness due to ground clearance.

Additionally, active air dams are known to raise and lower an air dam during operation of the vehicle in order to try to keep the air dam as close to the road surface as possible. Some of these air dam designs are complex and have to consider obstacle avoidance to ensure the air dam does not catastrophically contact the road surface or other road obstacles and hazards during operation.

Therefore, it is a goal in the art to provide an air dam which avoids any ground clearance issues. Also if possible it would be desirable to provide air dam effects in for a vehicle without requiring a physical part to change the shape of the vehicle and which will maintain ground clearance and approach angle requirements of the vehicle without worry as to obstacles while maintaining a system which will direct air flow around and under the vehicle, reducing aerodynamic drag and improving fuel efficiency.

SUMMARY OF THE INVENTION

In accordance with the present invention there is provided an air dam for a vehicle which provides a so called virtual air dam air curtain barrier. The air dam of the present invention includes a front panel of a vehicle having a downward facing surface at a lateral front edge. At least one air curtain or air jet is provided for forcing air downward toward the ground for creating an aerodynamic barrier of air, which reducing turbulence caused by the underbody of a vehicle.

The "virtual" air dam of the present invention is used to virtually change the shape of front air dam area of a vehicle by using strong jets of air to manipulate the main airflow around and underneath the vehicle. This technique is also called active flow control. This eliminates any ground clearance issues which might otherwise interfere with a normal air dam. The air jets create an air barrier to direct air flow around and under the vehicle reducing aerodynamic drag and improving fuel efficiency Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a rear view of the virtual air dam of FIG. 1 made in accordance with the teachings of the present invention;

FIG. 12 is a perspective of the clip of FIG. 10 without the Synthetic air module;

FIG. 13 is a perspective view showing a first group of interconnected clips for providing an array of synthetic air jet modules;

FIG. 14 is a perspective view showing a second group of interconnected clips for providing an array of synthetic air jet modules;

DETAILED DESCRIPTION OF THE PREFERRED EMBODIMENTS

Figure 1:
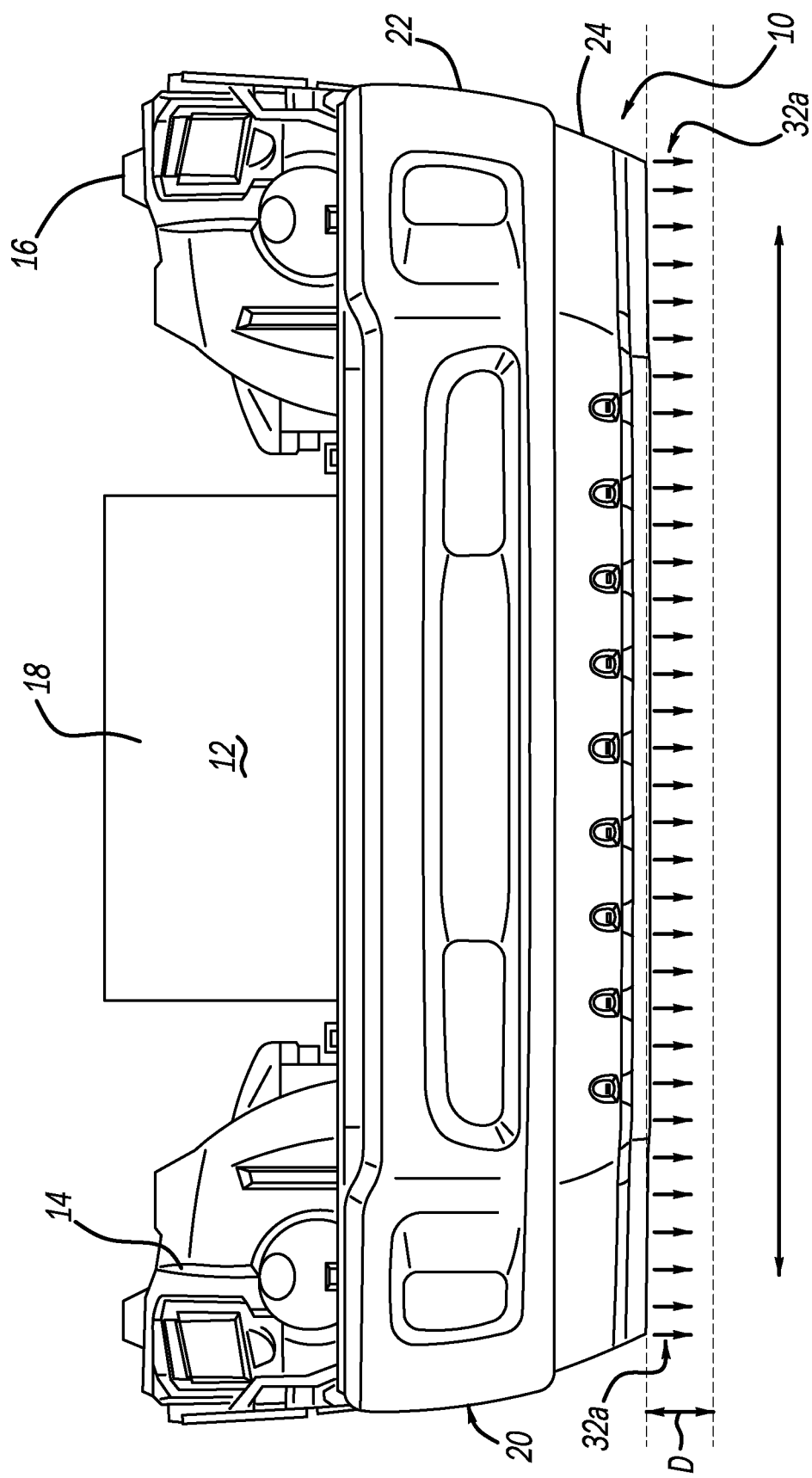
FIG. 1 is a front view of a virtual air dam made in accordance with the present invention.
Figure 3A:
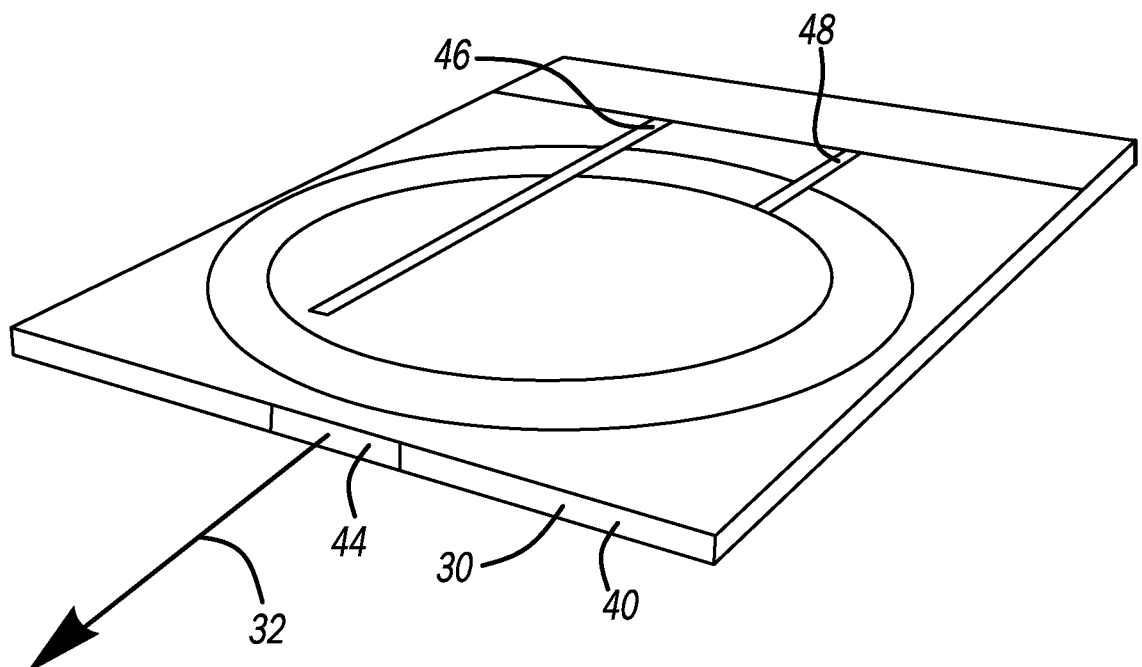
FIGS. 3A-3F are examples of a suitable synthetic jet actuator and their operation used in the air dam of the present invention.
Figure 3B:
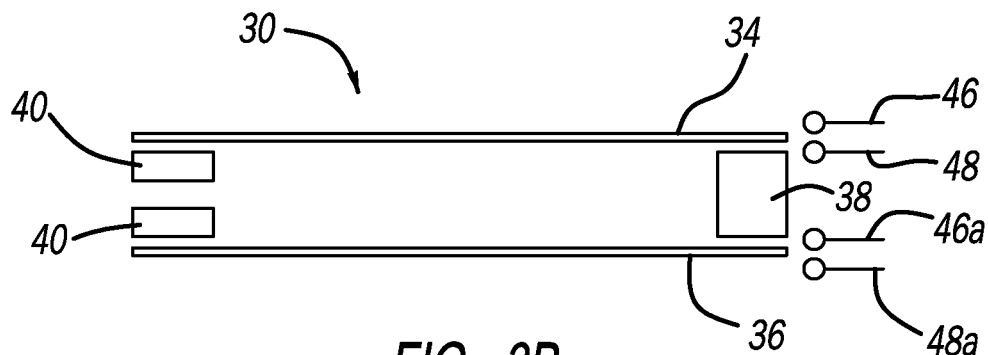
Figure 3C:
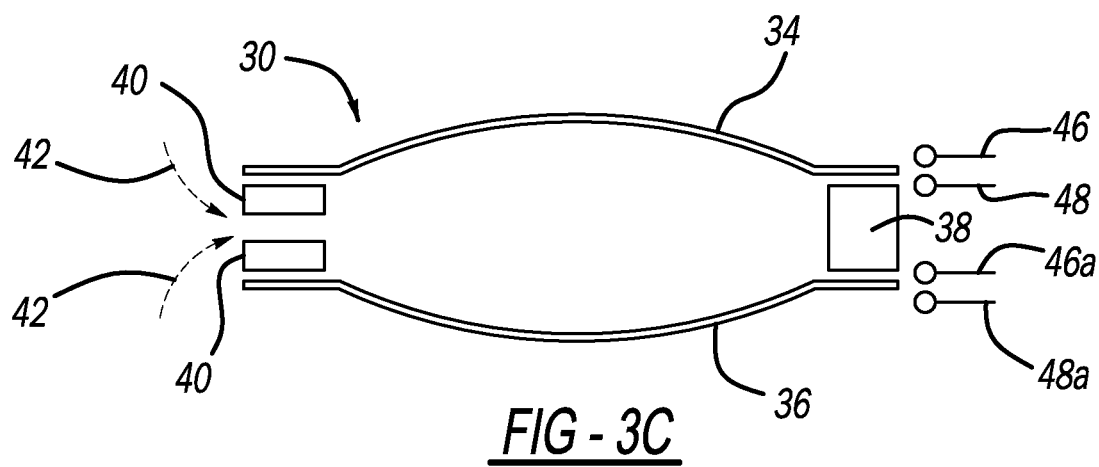
Figure 3D:
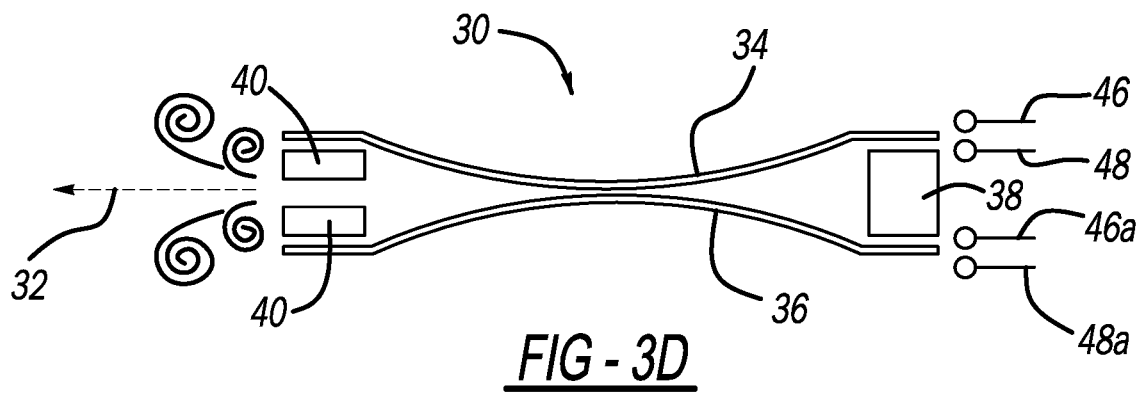
Figure 3E:
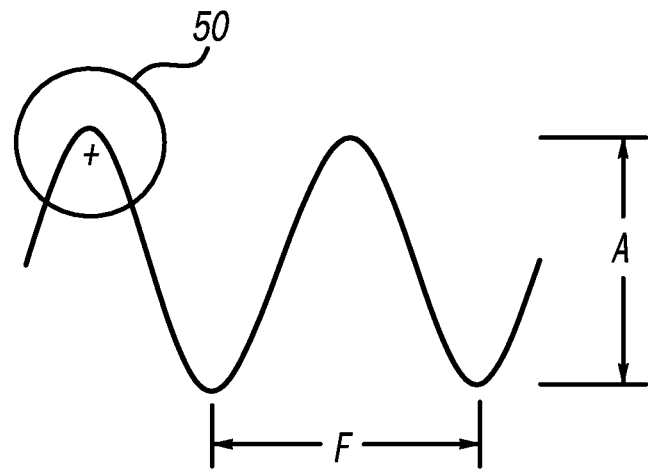
Figure 3F:
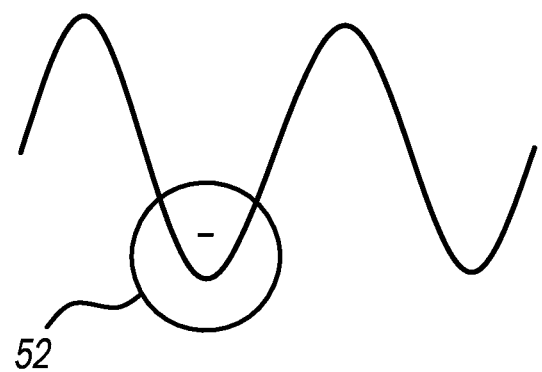

The following description of the preferred embodiment(s) is merely exemplary in nature and is in no way intended to limit the invention, its application, or uses.

In accordance with the present invention there is provided an air dam generally shown at 10 for a vehicle 12. The vehicle 12 includes frame members 14, 16 and 18. A front panel generally indicated at 20 of vehicle 12. The air dam 10 has a bumper 22 and a close out panel 24 having a downward facing surface 26 at a bottom edge 28 at least air curtain which can be generated by a compressor, a fan, an air pump, a compressed air source, ducted inlet air, or a synthetic jet actuator is provided such as by an air jet 30 forcing air 32 downward toward the ground for creating an aerodynamic barrier of air reducing turbulence caused by the underbody of a vehicle. Preferably, the air curtain is provided over the entire width of the vehicle for reducing turbulence created under the vehicle.

In a first embodiment a plurality of air jets 30 shown by arrows 32a are provided in order to displace air in a downward direction to provide a virtual air dam for the vehicle. Preferably the jets used in the present invention are synthetic jet actuators provided by Actasys of Watervliet, New York. The number and output of the actuators is determined by the parameters, of the particular installation. Preferably the bottom edge 28 is positioned to be a distance "D" from the ground which is effective in the capacity and number of air jets and speed capabilities of the vehicle for providing a curtain of air which effectively creates a wall of air which deflects air under and or around the front of the vehicle during travel of the vehicle in a forward direction. Typically it is found that positioning the air jets from about 50 to about 70 mm above the ground surface provides an effective air dam of the present invention.

Figure 4A:
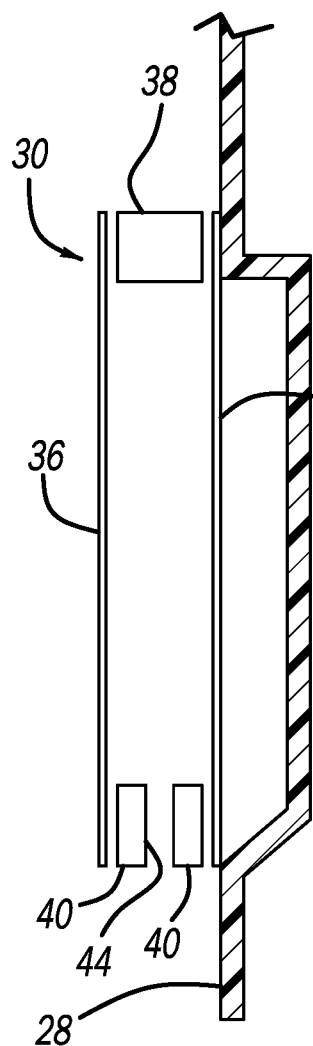
FIGS. 4A-4C show a typical cycle of the synthetic air jet of the present invention.
Figure 4B:
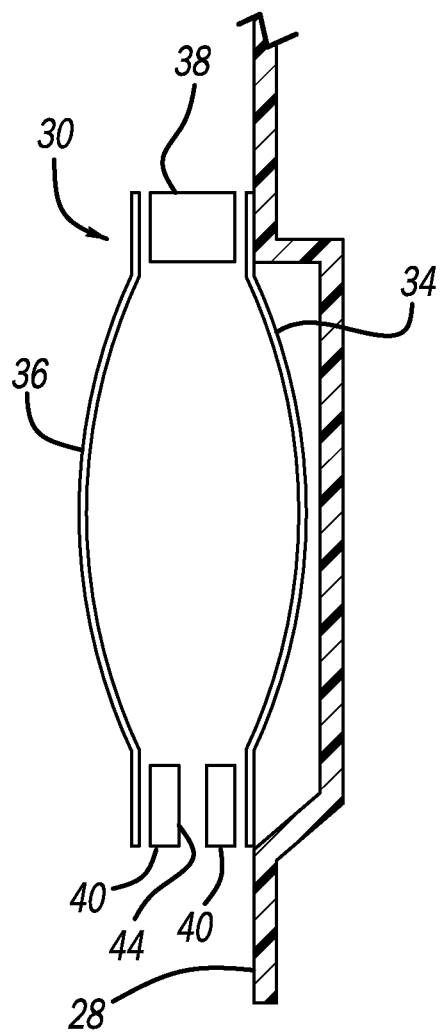
Figure 4C:
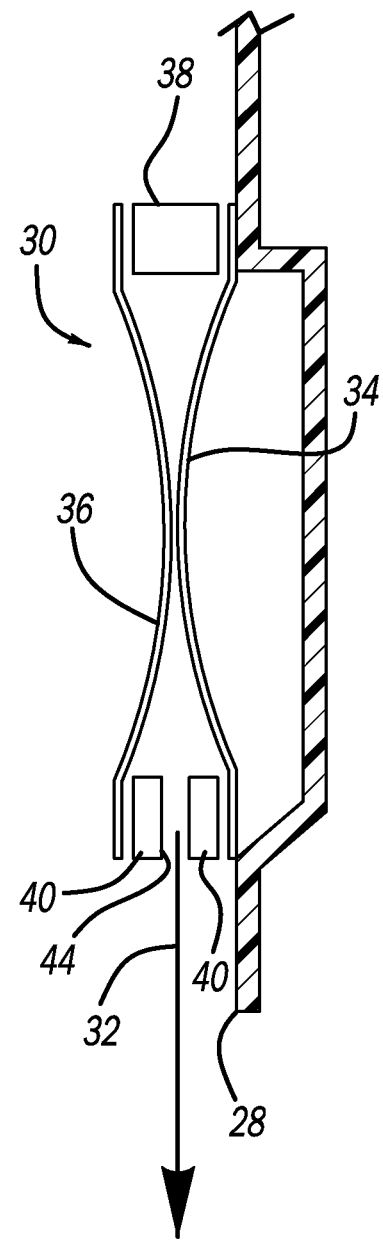
Figure 5A:
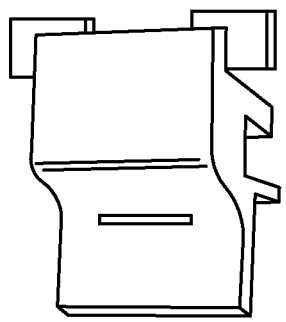
FIGS. 5A-5D are perspective views of the clips for attaching the synthetic air jets of the present invention to the air dam of a vehicle.
Figure 5B:
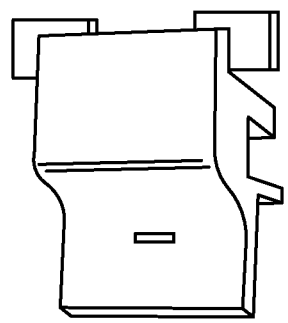
Figure 5C:
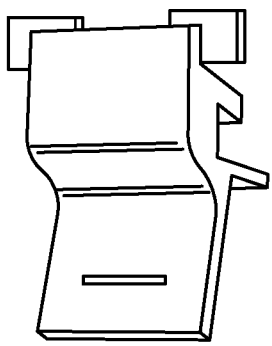
Figure 5D:
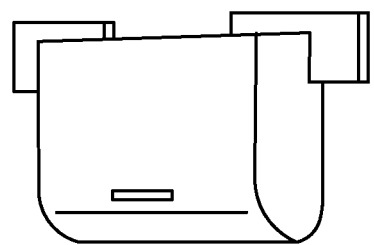

Referring to FIGS. 3A through 3F and FIGS. 8 through 10, the synthetic air jets include diaphragms 34 and 36 separated by spacers 38 and 40. The spacer 40 has a nozzle end opening 44 for ingestion of air as shown by the arrows 42 when the diaphragms 34 and 36 are expanded and expelling air dam air 32 when the diaphragms 34 and 36 are contracted toward one another as shown best in FIGS. 3D and 4C. The diaphragms are controlled by current directed to the membranes through wires 46, 48 and 46a, 48a these wires are attached to a controller and the controller is also controlled in coordination with an engine control unit or speed sensor which sends signals to preselected synthetic air modules or to all of the synthetic air modules at once at an amplitude (a) and a frequency (f) to provide the proper amount of air for forming an appropriate air dam for reducing drag on the lower front end of the vehicle which is adjusted depending on the vehicle parameters of width and distance of the edge 28 above the ground, the speed of the vehicle and/or the condition of the roadway itself. The current applied either +(50) or −(52) controls the intake and ejection cycles of the air from the jets. These units are capable of operating at 140 m/s at 810 Hz at 120 V rms which is suitable for use in the present invention. Actuator frequencies useful in the present invention are range from about 400 to about 900 Hz. Jet air speeds useful in the present invention range from about 50 meters/second to about 140 meters/second. Jet Pulse modulation useful in the present invention range from about 10 Hz to about 50 Hz.

Figure 6:
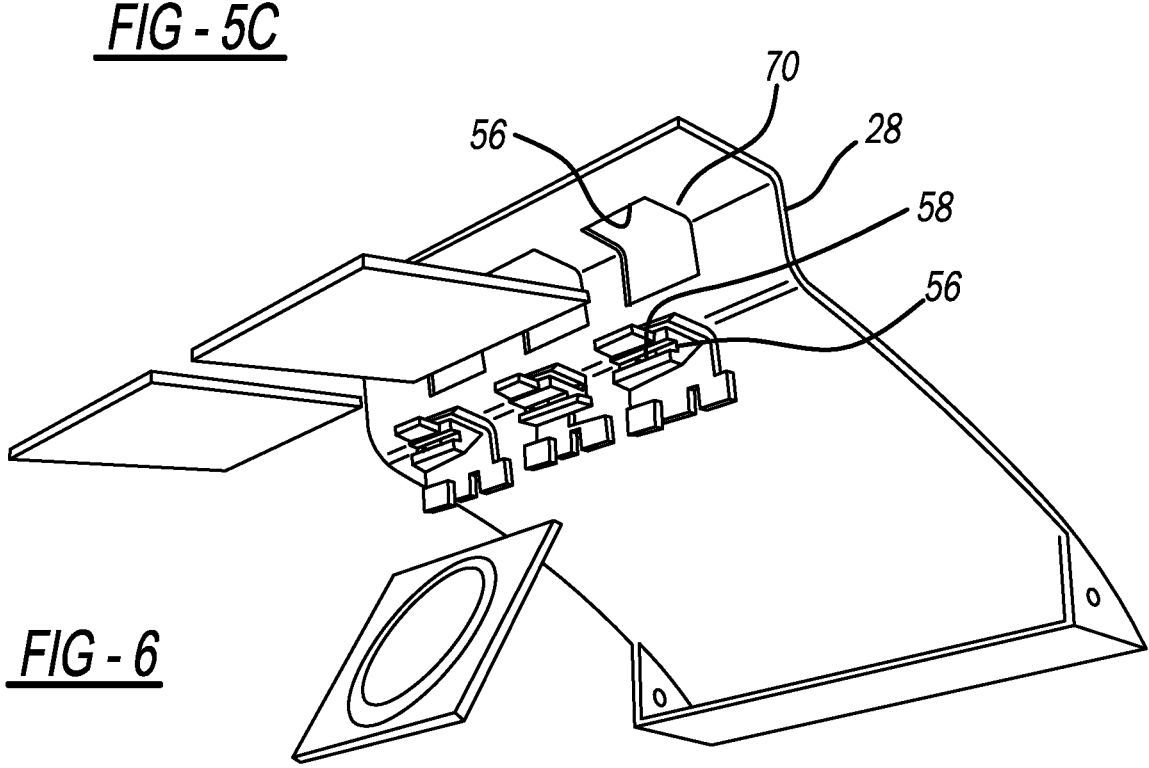
FIG. 6 is an exploded perspective view of a typical installation of the synthetic air jets and clips into an attachment assembly for attachment to a front fascia area of a vehicle.
Figure 7:
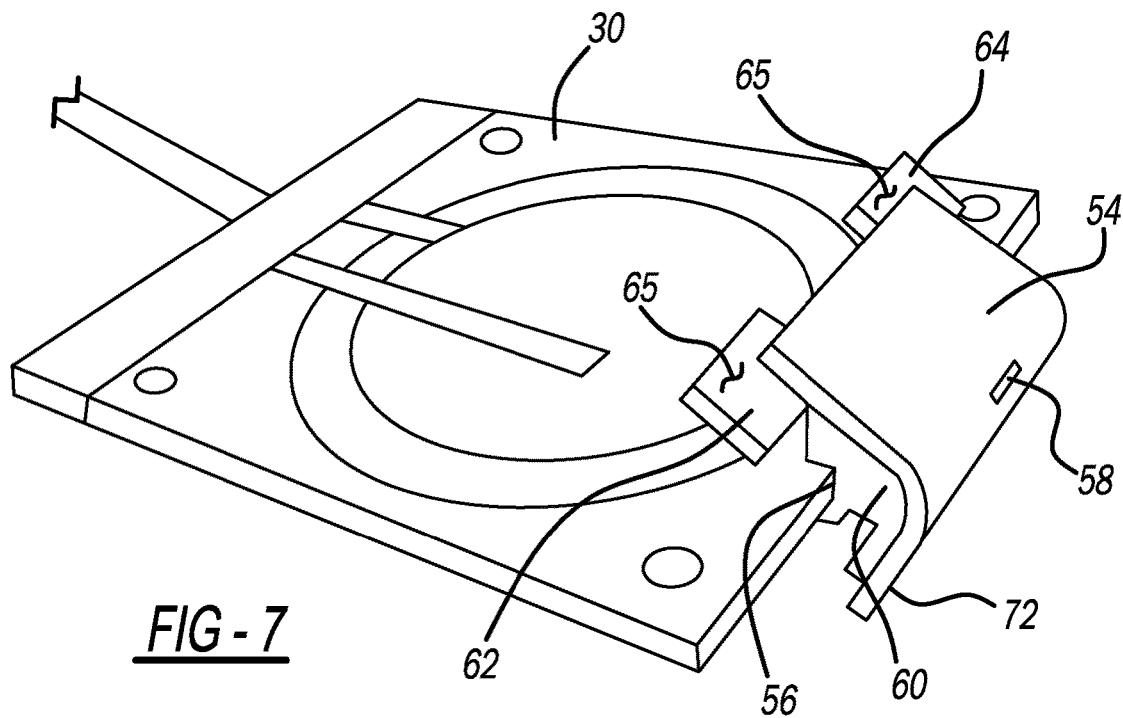
FIG. 7 is a perspective view showing a synthetic air jet module attached in a 165 degree angle clip.
Figure 8:
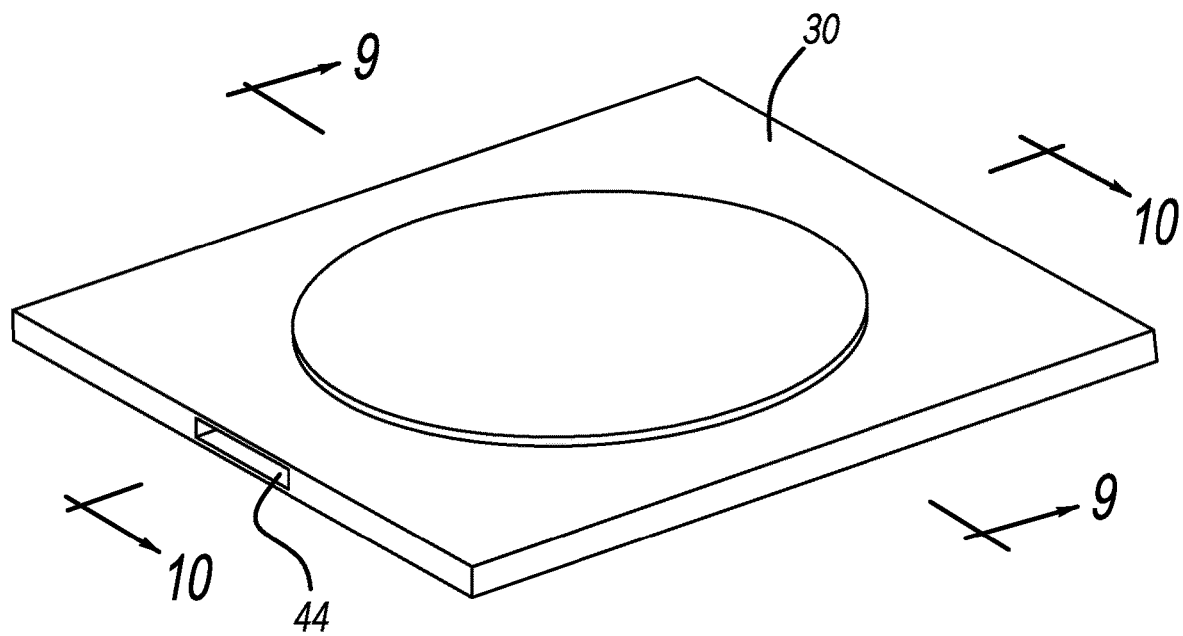
FIG. 8 is a perspective view of a synthetic air jet module.
Figure 9:
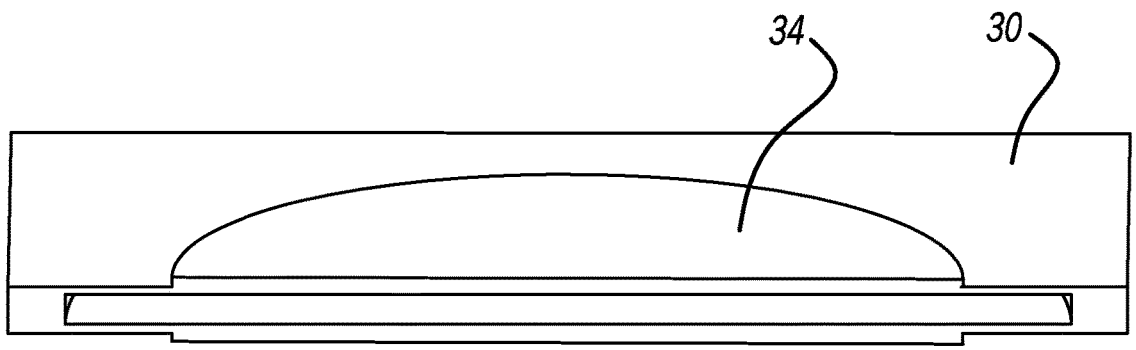
FIG. 9 is a sectional view of the synthetic air jet module of FIG. 8 taken along line 9-9 of FIG. 8.
Figure 10:
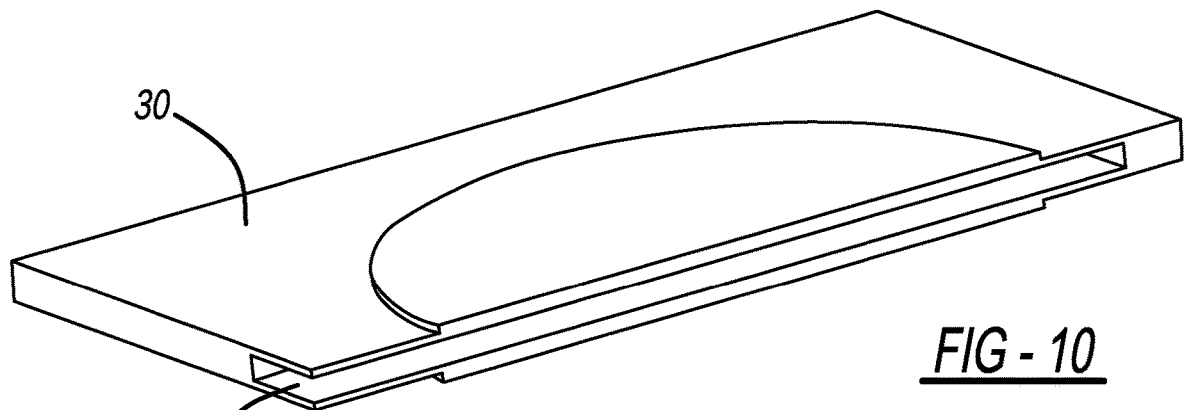
FIG. 10 is a sectional view of the synthetic air jet module of FIG. 8 taken along line 10-10 of FIG. 8.
Figure 11:
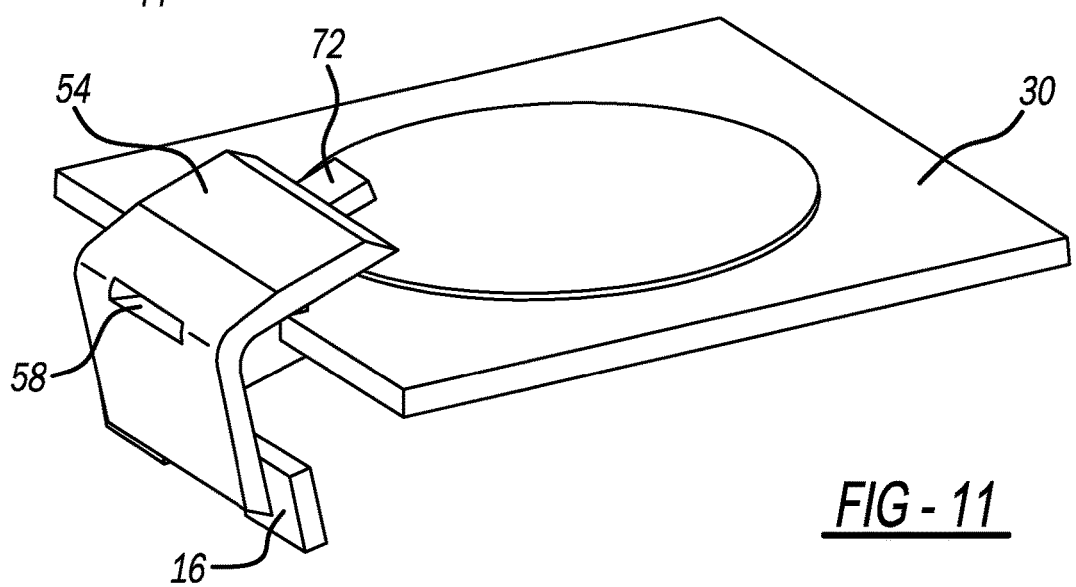
FIG. 11 is a perspective view of an attachment clip holding a synthetic air jet module.

Referring now to FIG. 7 there is shown a typical application of a synthetic air jet module 30 secured in attachment clip 54. Attachment clip 54 is designed to be attached to the front edge 28 of a vehicle fairing such as shown in FIG. 6. Attachment clip 54 is designed with an air jet holding slot portion 56 for securing the air jet module 30 such that the nozzle end opening 44 is positioned to inject air into and air directing slot 58. The air jet module is held in place by a suitable adhesive or mechanically by a press fit or clip arrangement. Induction welding or other plastic welding procedures are also used if desired for securing module 30 in slot 56. The attachment clip 54 includes a structural body portion 60 which includes positioning tabs 62 and 64. The structural body and positioning tabs are used to provide proper angular positioning of the orifice 58 for directing the airflow at a predetermined angle from the edge 28 of the fairing. The facing surfaces 65 and 65 engage and are attached to the inner surface 70 of the fairing along with the extended edge face 72 of the attachment clip 54. FIGS. 5A to 5D show examples of embodiments of attachment clips 54 for providing flow at various points in a lower edge of a panel.

Figure 15:
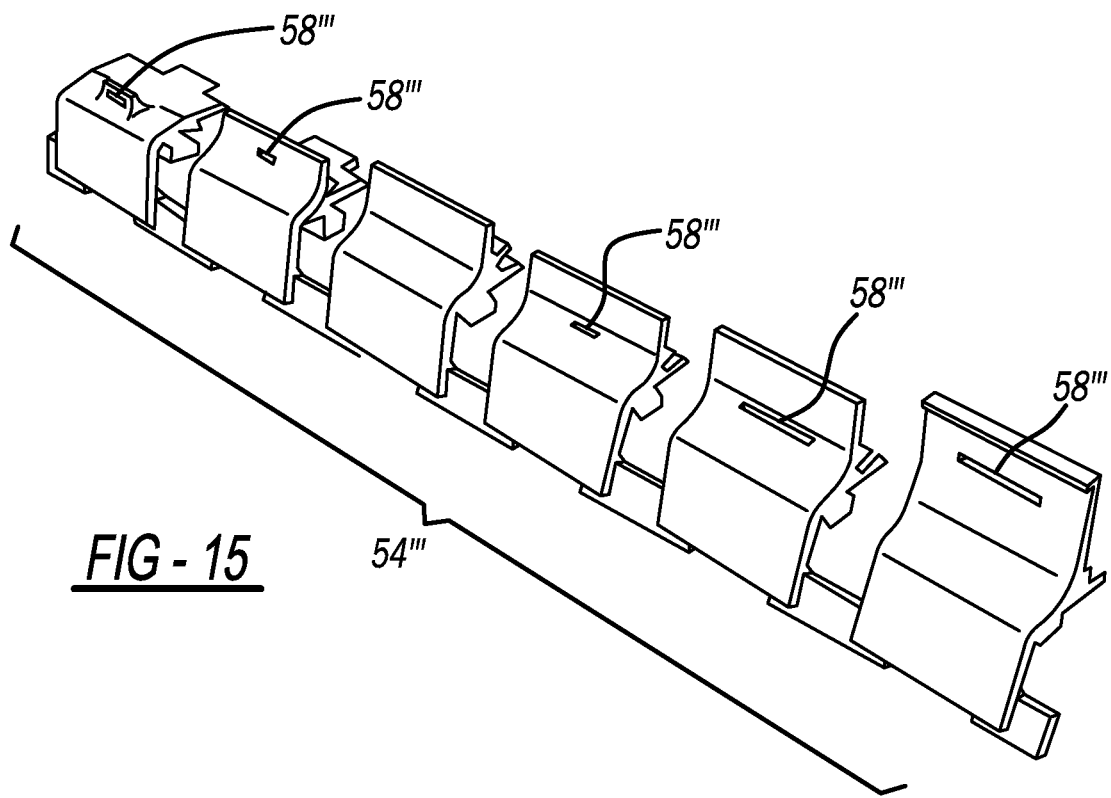
FIG. 15 is a perspective view showing a third group of interconnected clips for providing an array of synthetic air jet modules; and, FIG. 16 is a perspective view showing a group of interconnected clips for providing an array of synthetic air jet modules installed along a curved portion of the lower fascia edge.
Figure 16:
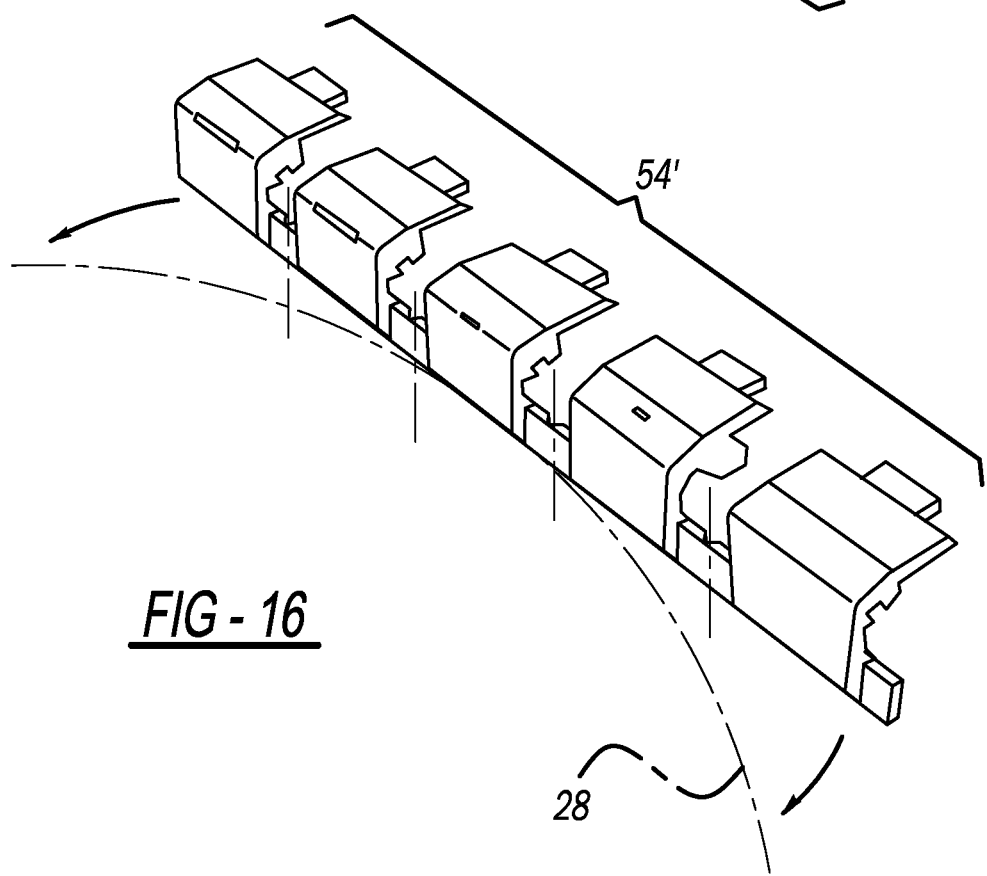

As shown in FIGS. 13 through 15, in a typical illustration series of custom designed clips 54', 54" and 54''' are custom designed with varying orifices 58', 58" and 58''' to provide exacting airflow along the edge 28 of the fairing in the proper angle and direction to achieve an effective air dam. The clips 54', 54" and 54''' are either attached together as a unit for installation in the fairing and/or independently installed directly in the fairing depending on manufacturing requirements. As schematically shown in FIG. 16 the installation is readily adaptable for installing along curved edges 28 of a fairing.

Additionally, as will be readily appreciated by one skilled in the art the air jets are controllable by an engine control unit or speed sensor or other method such that the amount of air jet supplied is varied in accordance with vehicle speed and conditions to provide the necessary air dam for the speed or driving conditions of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air dam for a vehicle comprising:
    a front panel of the vehicle having a downward facing surface at a lateral front edge at least one aerodynamic air curtain forcing air downward toward the ground for creating an aerodynamic barrier of air reducing turbulence caused by an underbody of the vehicle;
    wherein the downward facing surface included a plurality of removeable clips, each of plurality of clips including an air directing orifice;
    a plurality of air jet module cartridges each including a nozzle end opening, each of said plurality of air jet module cartridges held by said clips with said nozzle end opening aligned for receiving air from said nozzle end opening into said air directing orifice, for directing air in preselected directions for providing said aerodynamic air curtain.

2. The air dam of claim 1 wherein a plurality of air jets are provided on said edge for forming a wall of air engaging the ground and creating the air dam for the vehicle.

3. The air dam of claim 1 wherein the downward facing surface is from about 50 to about 70 mm from a ground surface.

4. The air dam of claim 2 wherein the plurality of air jets provides an air curtain along the entire width of the vehicle.

5. The air dam of claim 1 wherein the amount of air supplied to said air curtain is adjusted in accordance with the speed of the vehicle for providing an effective air dam at the front of the vehicle.

6. An air dam assembly for a vehicle comprising:
    a front panel of a vehicle having a downward facing surface at a lateral front edge;
    at least one air jet module including a nozzle end opening;
    at least one clip attachment to which the air jet module is secured, said clip attachment including an air directing orifice and removable attachment structure for removable attaching of the clip to the front panel at a predetermined position said air directing orifice aligned for receiving air from said nozzle end opening of said air jet module and for directing the air from said air jet orifice in a preselected direction for forcing air downward toward the ground and creating an aerodynamic barrier of air reducing turbulence caused by an underbody of the vehicle.

7. The air dam assembly of claim 6 wherein the clip further includes an air jet module holding slot and said air nozzle directing orifice is a slot for directing air from the air jet in a preselected direction upon mounting the attachment in the fairing.

8. The air dam assembly of claim 7 wherein the front panel includes an aperture for receiving the clip attachment and the clip attachment includes positioning tabs for positioning of the clip in the aperture.

9. The air dam assembly of claim 8 wherein the positioning tabs include facing portions for being attached to the rear side of the body panel.

10. The air dam assembly of claim 6 further comprising a plurality of attachment clips for attaching along the lower edge of the body panel.

11. The air dam assembly of claim 10 wherein preselected direction of the nozzle directing orifice are varied along the edge.

12. The air dam assembly of claim 11 wherein the attachment clips are configured such that preselected direction of the nozzle directing orifices are directed for providing the same angle of attack of air flow along substantially the entire edge of the panel.

13. The air dam assembly of claim 6 wherein the air jet modules are synthetic air jet modules which have variable air flow controlled by frequency modulation.

14. The air dam assembly of claim 10 wherein the air jet modules are synthetic air jet modules which have variable air flow controlled by frequency modulation.

15. The air dam assembly of claim 14 wherein a controller controls the actuation of the air jet modules for providing proper air jet depending on vehicle operating conditions.

* * * * *